G. W. SHERMAN.
POWER TRANSMISSION MECHANISM FOR MOTOR CYCLES AND OTHER VEHICLES.
APPLICATION FILED NOV. 14, 1908.

922,634.

Patented May 25, 1909.

3 SHEETS—SHEET 1.

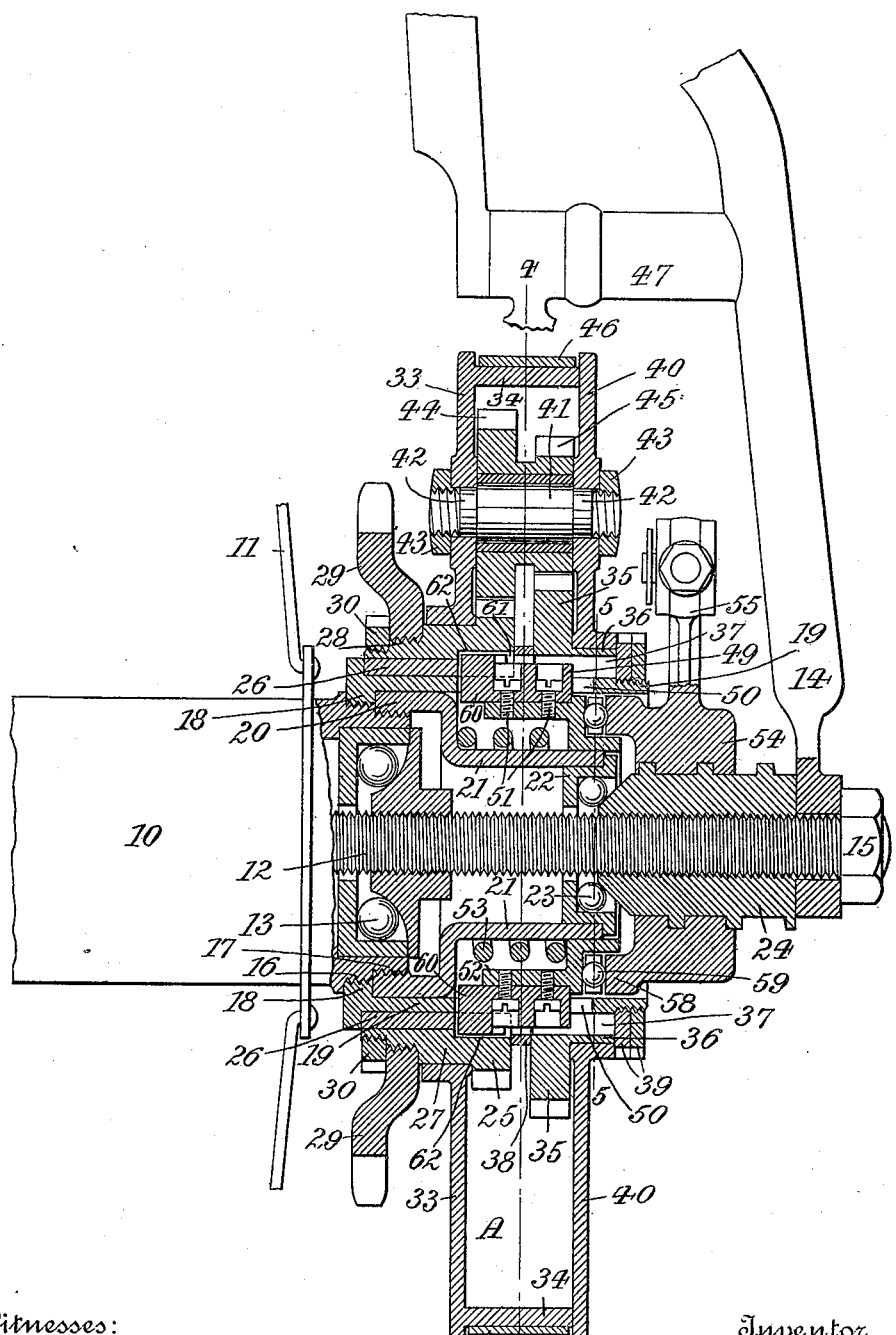

G. W. SHERMAN.
POWER TRANSMISSION MECHANISM FOR MOTOR CYCLES AND OTHER VEHICLES.
APPLICATION FILED NOV. 14, 1908.
922,634.
Patented May 25, 1909.
3 SHEETS—SHEET 3.
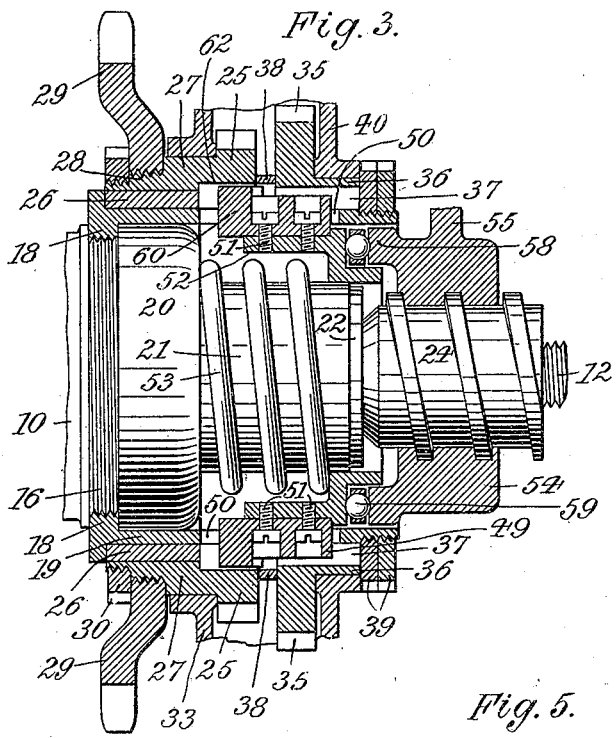
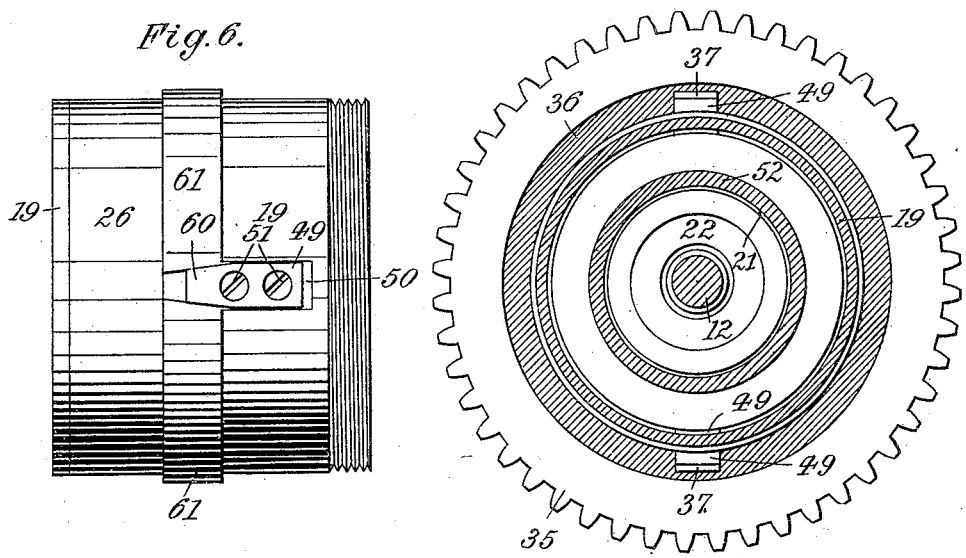

UNITED STATES PATENT OFFICE.

GEORGE W. SHERMAN, OF NEW YORK, N. Y.

POWER-TRANSMISSION MECHANISM FOR MOTOR-CYCLES AND OTHER VEHICLES.

No. 922,634.    Specification of Letters Patent.    Patented May 25, 1909.

Application filed November 14, 1908. Serial No. 462,566.

*To all whom it may concern:*

Be it known that I, GEORGE W. SHERMAN, a citizen of the United States, residing at New York city, (Brooklyn,) county of Kings, State of New York, have invented new and useful Improvements in Power-Transmission Mechanism for Motor-Cycles and other Vehicles, of which the following is a specification.

This invention relates to novel mechanism for transmitting power from a motor to the driving wheel of a vehicle, such as a motor cycle. This mechanism is so constructed that the vehicle can be propelled with various speeds and that the driving wheel can be entirely uncoupled from the driving gear, so that the motor may remain in operation while the motor cycle is at rest. Thus a quick start of the cycle may be effected by means of a hand lever which will cause the motor to be coupled to the driving wheel, so that the cycle is propelled with the speed desired. In this way any necessity of first starting the cycle by the pedals, or other physical power, for the purpose of first setting the motor in operation is entirely obviated.

Figure 1:
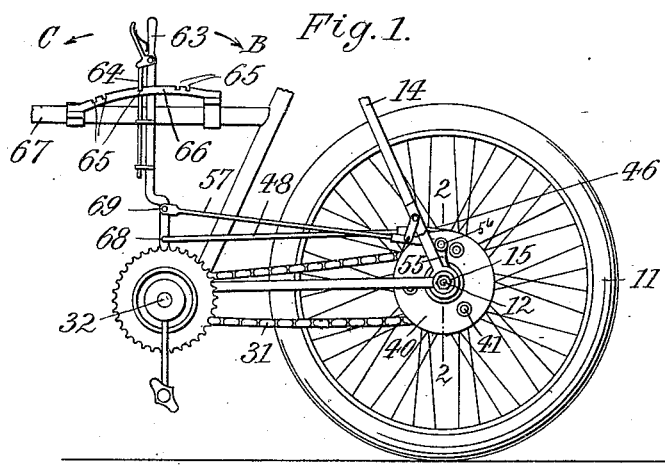
Figure 4:
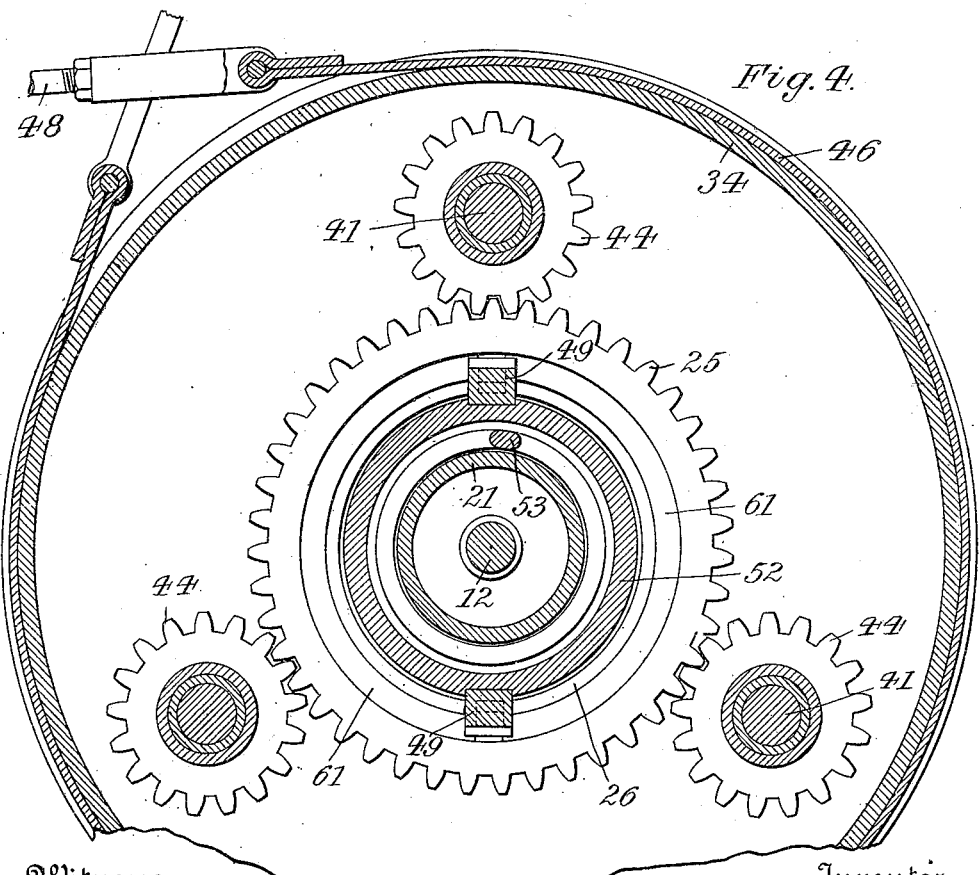

In the accompanying drawings: Figure 1 is a side view of part of a motor cycle provided with my improved power transmission mechanism; Fig. 2 an enlarged axial section through the two-speed clutch, on line 2—2, Fig. 1; Fig. 3 a similar section, showing the parts in a different position and with some of the elements omitted; Fig. 4 a cross section on line 4—4, Fig. 2; Fig. 5 a similar section on line 5—5, Fig. 2, showing the cup in view, and Fig. 6 a detail of the clutch-shoe and adjoining parts.

The numeral 10 designates the hub of the driving wheel 11 of a motor cycle or other vehicle. Hub 10 is rotatably mounted upon a relatively fixed threaded spindle 12, ball bearings 13 being interposed between said spindle and hub, as usual. Spindle 12 projects axially beyond hub 10 and carries at its outer end a brace 14 of the cycle-frame, to which it is secured by a nut 15. The outer end of hub 10 is provided with a pair of stepped threaded sections 16 and 17. Hub-section 16 is engaged by the threaded inner flange 18 of a hub extension sleeve 19, an accidental disengagement of the sleeve from the hub being prevented by a lock-nut 20 having a reduced section or neck 21. Into the latter is fitted a perforated cup 22 containing balls 23 that engage the beveled inner end of a clutch-worm 24 screwed upon spindle 12 and abutting against brace 14.

Upon sleeve 19 is loosely mounted a gear wheel 25, a bushing 26 being interposed between said sleeve and the hub 27 of the wheel. Hub 27 is threaded as at 28 for the reception of a sprocket wheel or driving gear 29, wheel 29 being locked to hub 27 by a suitable nut 30. Sprocket wheel 29 is engaged by a chain 31 connecting said wheel to a corresponding sprocket wheel on the pedal axle 32, which is driven from the motor, (not shown). Intermediate gear wheel 25 and sprocket wheel 29, there is loosely mounted on hub 27, the inner disk or plate 33 of a gear case A, said disk being provided with an annular brake-flange 34. Opposite loose gear wheel 25 there is mounted upon sleeve 19 a relatively fixed gear wheel or sun gear 35, the hub 36 of which is provided with a pair of diametrically opposed key grooves 37. Wheel 35, the diameter of which exceeds that of wheel 25, is prevented from axial displacement upon sleeve 19, by a grooved fiber ring 38 interposed between wheels 25 and 35, and by a pair of lock-nuts 39, engaging the free end of sleeve 19. Intermediate sun gear 35 and nuts 39, there is loosely mounted upon hub 36, the outer disk or cover 40 of gear case A, said disk abutting against flange 34 of disk 33. Disks 33, 40, are held together by a suitable number of bolts 41 stepped into the disks as at 42 and carrying outer nuts 43. Upon each bolt 41 turn loosely a pair of integral planet wheels 44, 45. Wheel 44 is of larger diameter than wheel 45 and engages loose gear wheel 25, while wheel 45 meshes into sun gear 35. Flange 34 of gear case A, is embraced by a brake-strap 46, one end of which is secured to a stay 47 of the cycle-frame, while its other end is by a suitable coupling connected to a bar 48 hereinafter described.

Grooves 37 of hub 36 are engaged by a pair of axially displaceable keys or feathers 49, passing through corresponding axial slots 50 of sleeve 19. Keys 49 are by screws 51 secured to a tubular key-carrier 52 slidably mounted upon neck 21 of lock-nut 20. A spring 53, embracing neck 21 and engaging carrier 52, tends to move the latter outward or away from hub 10. Clutch-worm 24 is engaged by a worm-nut 54 provided with a radially extending arm 55, to which is pivoted, at 56, a link 57 hereinafter described. Between an inner flange 58 of worm-nut 54 and key-carrier 52, anti-friction balls 59 are interposed.

The free or inner end of each key 49 is beveled to form a wedge 60 which is adapted to engage the corresponding beveled edges of a pair of semi-circular clutch-shoes 61, (Fig. 6). The latter are received within a circumferential inner recess 62 of hub 27, and are held against axial displacement by bushing 26 and ring 38. It will be seen that when worm-nut 54 is partially rotated upon worm 24, to shift key-carrier 52 and wedge keys 49 toward clutch-shoes 61, the latter will be spread and thus forced into contact with hub 27. Shoes 61 will thus participate in the rotation of wheel 25, which movement is transmitted by keys 49 and sleeve 19, to hub 10, for the purpose hereinafter described.

In order to operate worm-nut 54 and brake-strap 46, a hand lever 63 is loosely mounted upon pedal axle 32. Lever 63 is provided with a spring-influenced detent 64 adapted to engage corresponding notches 65 of a sector 66 secured to a brace 67 of the vehicle-frame. To hand lever 63 are pivoted, at 68, 69, the bar 48 and link 57, respectively.

As has already been mentioned, my improved power transmission mechanism is more particularly designed for motor cycles which permit a continuous operation of their motors. It is thus not necessary to arrest the motor when it is desired to stop the cycle, or to physically re-start the motor for propelling the cycle.

For uncoupling the driving wheel 11 from the motor, hand lever 63 is brought into its neutral or central position, (Fig. 1). If the hand lever is tilted backward in the direction of arrow B, the vehicle is propelled with full speed, while, when said lever is tilted forward in the direction of arrow C, the vehicle is propelled with reduced speed.

When lever 63 is in its central position, wedge 60 is withdrawn from clutch-shoes 61, and strap 46 embraces flange 34 but loosely, so that the rotation imparted to sprocket wheel 29, by chain 31, will cause a corresponding rotation of loose gear wheel 25, while sun gear 35 is held against rotation through key 49, by means of which it is coupled to the now stationary hub 10. The rotation thus imparted to planet wheel 44, by gear wheel 25, will result in a corresponding rolling of wheel 45 around sun gear 35, so that gear case A, will loosely turn upon wheel hubs 27, 36, in a direction opposite to that of sprocket wheel 29. In this way hub 10 and wheel 11 remain stationary, while the cycle motor is free to continue in its operation.

If hand lever 63 is tilted backward, full speed is imparted from sprocket wheel 29 to the vehicle, by directly coupling said wheel to driving wheel 11. In this position of hand lever 63, strap 46 still loosely embraces gear case A, while worm-nut 54 is, through link 57, so turned that wedge-carrier 52 is advanced toward clutch-shoes 61, against the action of spring 53. Wedges 60 will spread shoes 61 into contact with rotating hub 27 to which sprocket wheel 29 is secured. Movement will now be imparted from the latter through hub 27, clutch-shoes 61, wedged keys 49 and slotted sleeve 19, to hub 10 of wheel 11. In this way wheel 11 will be rotated at the same speed with which sprocket wheel 29 turns.

When hand lever 63 is brought from its backward into its forward position, keys 49 are withdrawn from shoes 61, thus uncoupling the latter from hub 27, while brake-strap 46 is simultaneously applied to gear case A. In this way case A, is held against movement, so that the rotation of sprocket wheel 29 and gear wheel 25 will cause a corresponding rotation of planet wheels 44, 45, around the relatively stationary bolts 41. The movement of wheels 45 will be imparted to hub 10 through sun gear 35, keys 49 and slotted sleeve 19. Owing to the difference in diameters of gear wheels 25, 35 and planet wheels 44, 45, hub 10 will be rotated at a speed which is less than that of sprocket wheel 29, so that the desired speed reduction of the vehicle is obtained.

It will be seen that by my device effective and reliable means are provided for propelling a vehicle at full and reduced speed, and for permitting the driving motor to continue in its operation when the vehicle is at rest.

I claim:

1. A device of the character described, comprising a hub having a threaded section, a threaded sleeve engaging said section, a driving gear loosely mounted upon the sleeve, a gear case, a planet gear carried by said case and interpolable between driving gear and sleeve, and means for directly coupling the driving gear to the sleeve.

2. A device of the character described, comprising a hub having a threaded section, a threaded sleeve engaging said section, a gear wheel loosely mounted on the sleeve, a driving gear rigidly connected to the gear wheel, a gear case, a planet gear carried by said case and interpolable between gear wheel and sleeve, and means for directly coupling the gear wheel to the sleeve.

3. A device of the character described, comprising a hub having a threaded section, a threaded sleeve engaging said section, a driving gear loosely mounted upon the sleeve, a gear case, a planet gear carried by said case and interpolable between driving gear and sleeve, semi-circular clutch shoes intermediate driving gear and sleeve, and means carried by the sleeve for spreading the clutch shoes into contact with the driving gear.

4. A device of the character described, comprising a hub having a threaded section, a threaded sleeve engaging said section, a driving gear loosely mounted upon the sleeve, a gear case, a planet gear carried by said case and interpolable between driving gear and sleeve, semi-circular clutch shoes intermediate driving gear and sleeve, a worm, a worm nut, and means for operatively connecting the worm nut to the clutch shoes.

5. A device of the character described, comprising a hub having a threaded section, a threaded sleeve engaging said section, a driving gear loosely mounted upon the sleeve, a gear case, a planet gear carried by said case and interpolable between driving gear and sleeve, semi-circular clutch shoes intermediate driving gear and sleeve, a screw spindle centered in the hub, a worm carried by said spindle, a worm nut engaging the worm, and means for operatively connecting the worm nut to the clutch.

6. A device of the character described, comprising a hub, a sleeve secured thereto, a driving gear rotatable on the sleeve, a locking nut having a neck and engaging the sleeve, a spring-influenced key-carrier slidable on said neck, keys secured to said carrier, means actuated by the keys for coupling the driving gear to the sleeve, and means for operating the key-carrier, substantially as specified.

7. A device of the character described, comprising a hub, a sleeve secured thereto, a recessed gear wheel rotatable on the sleeve, a driving-gear secured to the gear wheel, a pair of clutch-shoes engaging the wheel-recess, wedged keys adapted to engage the clutch-shoes, and means for operating the keys, substantially as specified.

8. A device of the character described, comprising a hub, a slotted sleeve secured thereto, a gear wheel rotatable on the sleeve, a driving gear secured to the gear wheel, a pair of clutch-shoes adapted to engage the gear wheel, a grooved sun gear, planet wheels intermediate gear wheel and sun gear, slidable keys engaging the sleeve-slots and sun gear grooves, and means for bringing said keys into operative engagement with the clutch-shoes, substantially as specified.

9. A device of the character described, comprising a hub, a slotted sleeve secured thereto, a locking nut engaging the sleeve and having a neck, a recessed gear wheel rotatable on the sleeve, clutch-shoes adapted to engage the wheel-recess, a sun gear having a grooved hub, a rotatable gear case inclosing the gear wheel and sun gear, planet wheels carried by said case and engaging gear wheel and sun gear, a spring-influenced key-carrier slidable on the neck, wedged keys secured to said carrier and engaging the sleeve-slots and sun gear grooves, and means for axially displacing the key-carrier to bring the key-wedges into operative engagement with the clutch-shoes, substantially as specified.

10. A device of the character described, comprising a hub, a sleeve secured thereto, a gear wheel rotatable on the sleeve, a sun gear, a rotatable gear case inclosing the gear wheel and sun gear, planet wheels carried by said case and engaging the gear wheel and sun gear, a brake-strap engaging the gear case, a clutch intermediate the sleeve and gear wheel, and a hand lever operatively connected to the brake-strap and clutch, substantially as specified.

11. A device of the character described, comprising a hub, a pedal axle, a driving gear rotatable thereon, a gear case, a planet gear carried by said case and interpolable intermediate driving gear and hub, a brake-strap encircling the gear case, a clutch for directly coupling the driving gear to the hub, a hand lever, and means for operatively connecting said lever to the brake-strap and clutch, substantially as specified.

Signed by me at Pottstown, Pennsylvania, this sixth day of November, 1908.

GEO. W. SHERMAN.

Witnesses:
 JESSE R. EVANS,
 F. D. SHOMO.